(12) United States Patent
Fong et al.

(10) Patent No.: US 6,590,882 B1
(45) Date of Patent: Jul. 8, 2003

(54) MULTIPLEXING/DEMULTIPLEXING SCHEMES BETWEEN WIRELESS PHYSICAL LAYER AND LINK LAYER

(75) Inventors: Mo-Han Fong, Verdun (CA); Chung-Ching Wang, Plano, TX (US); Geng Wu, Verdun (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/268,931

(22) Filed: Mar. 16, 1999

Related U.S. Application Data

(60) Provisional application No. 60/100,358, filed on Sep. 15, 1998.

(51) Int. Cl.[7] .............................. H04B 7/216; H04J 3/24
(52) U.S. Cl. .................. 370/335; 370/342; 370/474
(58) Field of Search .............................. 370/328, 329, 370/330, 335, 336, 337, 338, 340–347, 349, 474, 468, 470

(56) References Cited

U.S. PATENT DOCUMENTS

| | | | |
|---|---|---|---|
| 5,642,354 A | * 6/1997 | Spear | 370/329 |
| 6,307,867 B1 | * 10/2001 | Roobol et al. | 370/342 |
| 6,317,430 B1 | * 11/2001 | Knisely et al. | 370/394 |
| 6,353,907 B1 | * 3/2002 | van Nobelen | 714/746 |
| 6,363,058 B1 | * 3/2002 | Roobol et al. | 370/310 |

* cited by examiner

*Primary Examiner*—Chau Nguyen
*Assistant Examiner*—Soon-Dong Hyun
(74) *Attorney, Agent, or Firm*—Gibbons, Del Deo, Dolan, Griffinger & Vecchione

(57) ABSTRACT

In a communication system, physical-layer frames for transmission over the physical layer are assembled from link-layer protocol data units (PDU's) by combining several PDU's into a variable-length first block, and providing the first block with an error detection and/or correction code such as a CRC. The first blocks are mapped into fixed-length second blocks, including repetitive copies of the first blocks if space permits. The second blocks are mapped into physical-layer frames, including repetitive copies of the second blocks if space permits. After reception of the frames, the replication enhances the probability of recovering correct PDU's as verified by the error detection and correction codes.

24 Claims, 4 Drawing Sheets

MULTIPLEXING/DEMULTIPLEXING SCHEMES BETWEEN WIRELESS PHYSICAL LAYER AND LINK LAYER

CROSS-REFERENCE TO RELATED APPLICATIONS

This application claims the benefit of U.S. Provisional Application No. 60/100,358 filed Sep. 15, 1998.

FIELD OF THE INVENTION

The invention relates generally to the field of communication systems and more particularly to multiplex layer functionalities for multiplexing/demultiplexing data between Link Layer Protocol instances and physical channels of the transport layer.

BACKGROUND OF THE INVENTION

In third-generation CDMA systems, the services supported consist of a variety of data rates and delay profiles. Therefore, the rate of data flow from the upper protocol layers to the link layer varies in real time for a particular service and also among services. As a result, the number and sizes of link layer Protocol Data Units (PDU's) provided to the physical layer and their associated sizes varies from one physical layer frame duration to another. For the case of cdma2000, for example, the frame duration is fixed at 20 ms.

An attempt to improve error detection with such an array of data possibilities has involved a multiplexing scheme with repetition of link layer data blocks to achieve a fixed size logical transmission unit (LTU), with a Cyclic Redundancy Check (CRC) then being added to each LTU. However, performing repetition after adding the CRC (i.e., associating a CRC with each link layer data block multiplexed into the LTU) would improve the error detection and correction at the receiving end, since there would then be a plurality of copies each with its own CRC, thus improving the odds receiving one in which the CRC checks out correctly.

Accordingly there exists a need for a system and method of adding improving error detection and correction by adding CRC to variable size link layer data blocks before performing repetition to achieve a fixed-size LTU.

Accordingly it is an object of the present invention to provide systems and methods of adding improving error detection and correction by adding CRC to variable size link layer data blocks before performing repetition to achieve a fixed size LTU.

It is another object of the present invention to provide such a system and method which includes repetition by mapping different numbers of LTU's to a fixed size physical layer frame.

These and other objects of the invention will become apparent to those skilled in the art from the following description thereof.

SUMMARY OF THE INVENTION

In accordance with the teachings of the present invention, these and other objects may be accomplished by the present multiplex layer mapping of Link Layer PDU's to frames of the Physical Layer.

An embodiment of the invention includes a method of multiplexing Radio-Link Protocol (RLP) PDU's onto physical-layer frames including aggregating at least one RLP PDU into a first block; adding error detection and/or correction encoding (such as a cyclic redundancy check (CRC)) to the first block, mapping as many copies of the first block as possible into an fixed-size second block, and mapping as many copies of the second block as possible into a physical-layer frame.

The present invention proposes a solution for the multiplex layer to multiplex/demultiplex RLP PDU's to/from physical frames. Error detection and/or correction is improved by including CRC information prior to any repetitions of PDU's when mapping to the physical-layer frame. Repetition and zero bits padding may be applied at both the second-block level and the physical-layer frame level. Then the PDU recovery process at the receiving station may be performed in 2 stages: recovery of the second block from the physical-layer frame, and recovery the PDU's from the second block. The multiplicity of copies, each with its own CRC, enhances the probability of successful recovery of each PDU.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

The present invention of sending via the physical layer multiple copies of PDU's each with its own CRC may be realized in hardware such as an Application Specific Integrated Circuit (ASIC), Programmable Logic Gate Array (PLGA), microprocessor, etc. At the transmitting side, the multiplex layer multiplexes RLP PDU's from one or more RLP instances into logical transmission units (LTU's) to be sent to the physical layer. Those skilled in the art will recognize that RLP's are merely one form of Link Layer Protocols and as such this invention is also applicable to other Link Layer Protocols. Each physical layer frame is a concatenation of multiple fixed size LTU's. At the receiving side, the multiplex layer demultiplexes LTU's into RLP PDU's to be forwarded to the respective RLP instances.

Figure 1:
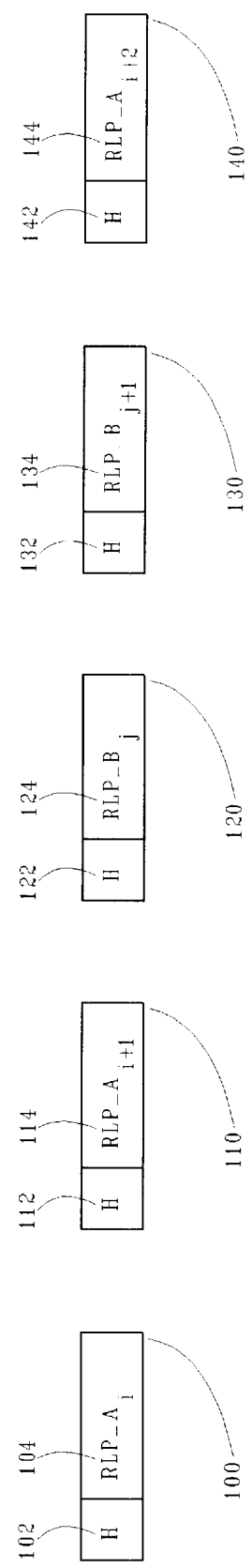
FIG. 1 depicts Protocol Data Units (PDU's) from two CDMA Radio Link Protocol (RLP) instances as exemplary of Link Layer PDU's.

As shown in the Link-Layer example of FIG. 1, in which Radio Link Protocol is employed as exemplary, RLP PDU's may originate from one or more RLP instances, and each contains a header and a data portion. For example, PDU 100 contains header 102 and data portion 104 from RLP instance A. PDU 110 contains the second data portion from RLP instance A, and PDU 140 contains the third data portion.

PDU's 120 and 130 contain the first and second data portions from RLP instance B.

Figure 2:
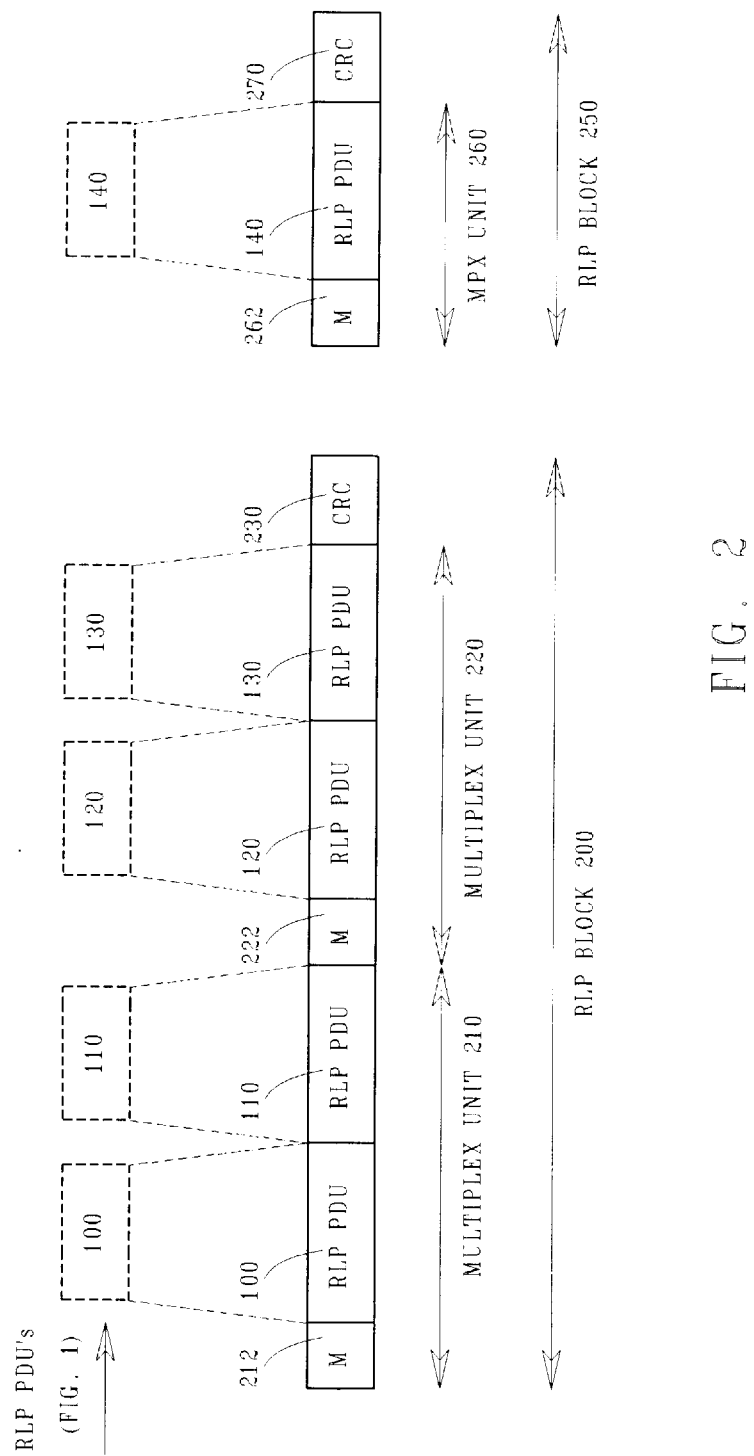
FIG. 2 depicts multiplexing in the Multiplex Layer of the PDU's of FIG. 1 into multiplex units and further into CDMA RLP blocks as exemplary of Link Layer Protocol.
Figure 3:
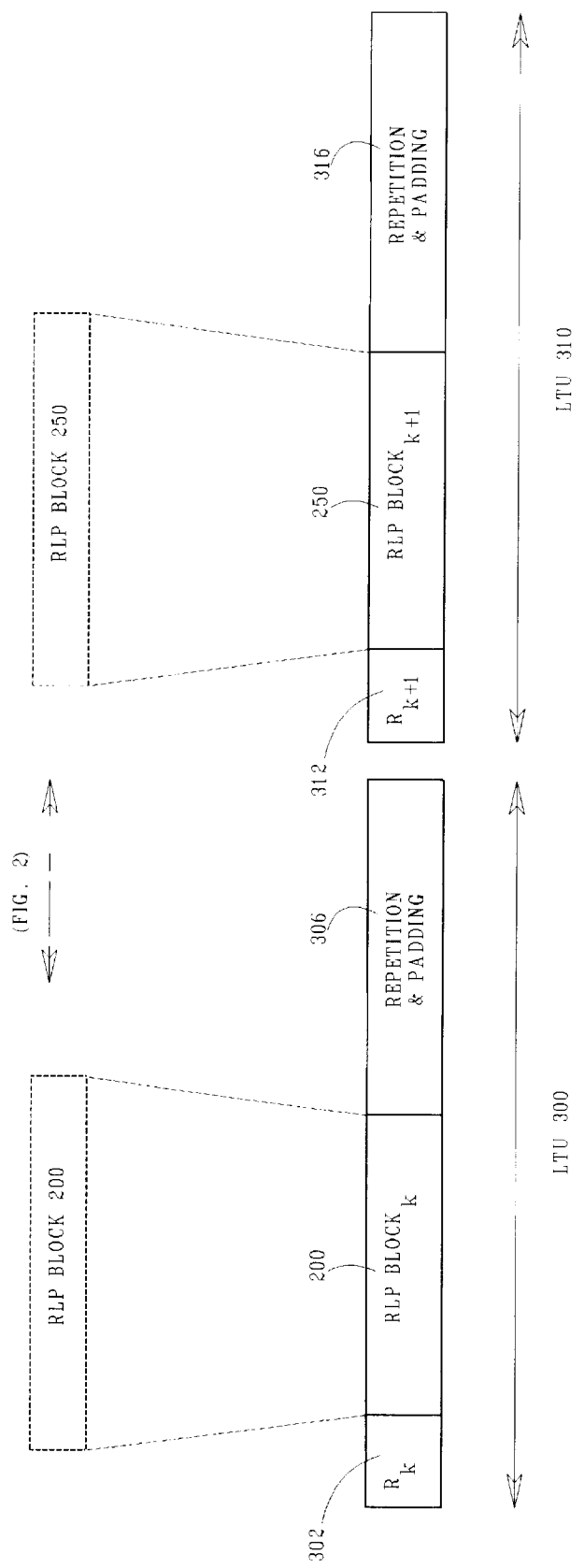
FIG. 3 depicts mapping in the Multiplex Layer of the Link-Layer RLP blocks of FIG. 2 into Logical Transmission Units (LTU's)
Figure 4:
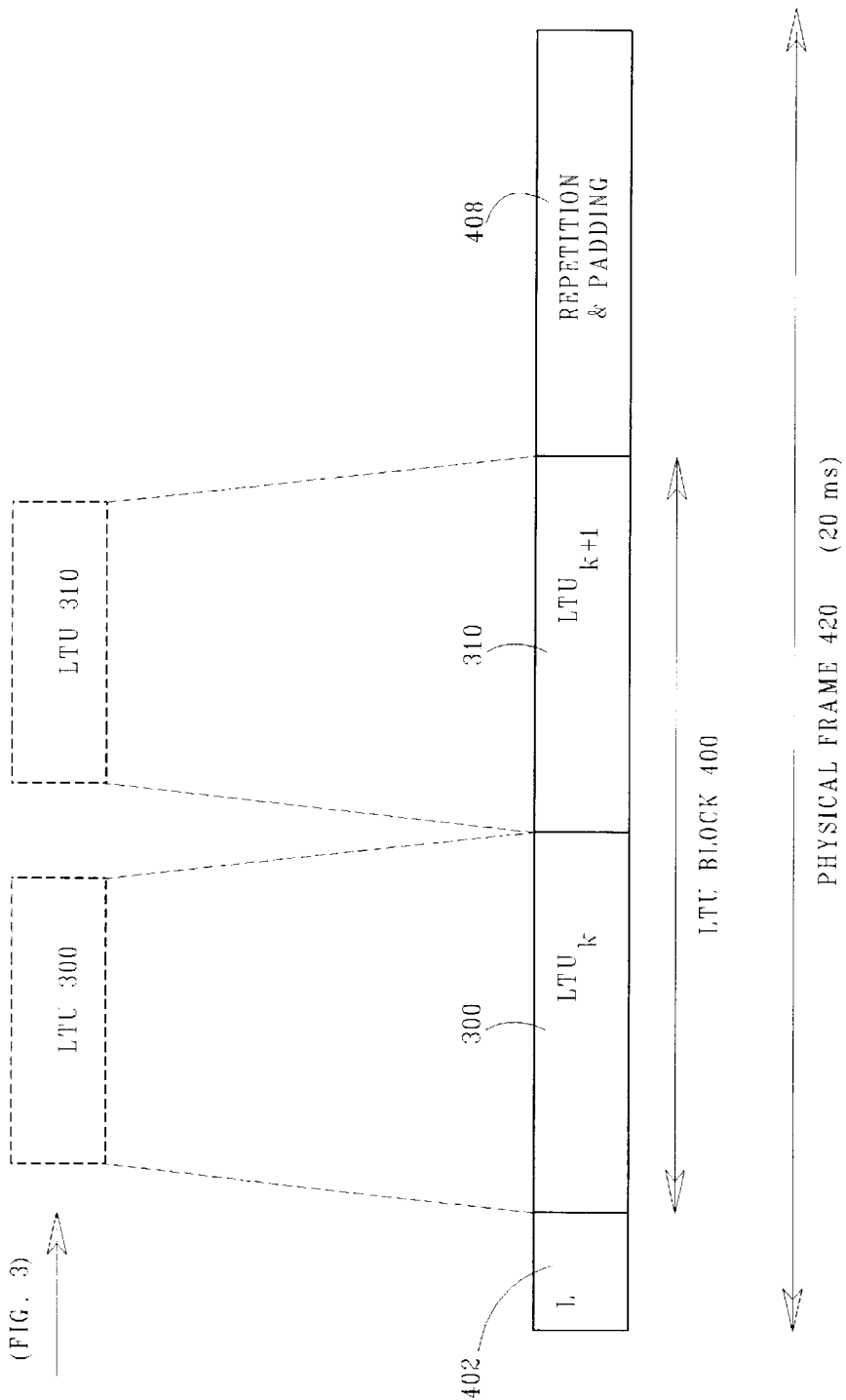
FIG. 4 depicts mapping in the Multiplex Layer of the LTU's of FIG. 3 into LTU blocks and further into physical frames for transmission via the Physical Layer.

FIGS. 2, 3, and 4 illustrate an exemplary scheme of employing a Multiplex Layer for multiplexing and demultiplexing between the Link Layer and the Physical Layer. Multiplexing for transmission is discussed first.

FIG. 2 illustrates the multiplexing of the RLP PDU's into multiplex units, and the further combining of multiplex units into RLP blocks. In the particular scheme shown, the RLP PDU's belonging to the same service instance are grouped into a multiplex unit, identified by header M. PDU's 100 and 110, being successive PDU's from instance A, are multiplexed into multiplex unit 210, to which is added header 212, which is used to describe PDU's 100 and 110 for subsequent extraction from RLP block 200. PDU's 120 and 130, being successive PDU's from instance B, are multiplexed into multiplex unit 220, to which is added header 222. Cyclic redundancy check (CRC) information 230 is calculated for the aforementioned four PDU's and two headers. The four PDU's, the two headers, and the CRC information taken as a whole comprise RLP block 200.

The subsequent PDU 140 (from instance A), along with a header 262, comprises multiplex unit 260. CRC information 270 is computed and appended. The header 262, the PDU 140, and the CRC block 270, taken as a whole, comprise RLP block 250. Thus, one or more PDU's are aggregated to form a multiplex unit, and one or more multiplex units are aggregated to form an RLP block. Thus the RLP blocks are of variable size according to the total number of PDU's they contain. The present invention does not prohibit other schemes of multiplexing RLP PDU's to an RLP block.

FIG. 3 illustrates the mapping of variable-size RLP blocks into fixed-size Logical Transmission Units (LTU's). Depending on the number of RLP PDU's supplied by the RLP instances, an RLP block can contain 1 to $N_p$ RLP PDU's, where $N_p$ is the maximum number of allowable RLP PDU's for a particular LTU size (note that LTU size is fixed for a particular physical channel data rate). For example, for RLP PDU's corresponding to 9.6 kbps, $N_p$=1, 4, and 8 for LTU size corresponding to 9.6 kbps (i.e. one 9.6 kbps PDU's), 38.4 kbps (i.e. four 9.6 kbps PDU's) and 76.8 kbps (i.e., eight 9.6 kbps PDU's), respectively.

Each RLP block is mapped into an LTU. For example in FIG. 3 RLP block 200 (from FIG. 2) becomes RLP block$_k$ 200 of LTU 300. If the RLP block 200 does not fill up LTU 300, the entire RLP block is repeated as many times as possible in "repetition and padding" area 306 to get the LTU filled After inserting the RLP block the largest possible whole number of times, any remaining space in the repetition and padding area 306 is filled with some binary pattern. The present embodiment simply fills with zeros, although other data patterns could be used. Calculating and including the CRC before repetition increases the chances of getting a good CRC check on an RLP block during the recovery process at the receiving end.

The block repetition rate for RLP block$_k$ 200 with LTU 300 is identified by a 3-bit header $R_k$ 302, where $R_k = \lfloor LTU\_length/RLP\_block\_length \rfloor - 1$ and $0 \leq R_k \leq 7$.

($\lfloor \ldots \rfloor$ connotes the floor function.) Those skilled in the art will recognize that a header may be used that is greater or less than three bits without departing from the scope of the invention.

FIG. 4 illustrates the mapping of LTU's 300 and 310 (from FIG. 3) into LTU block 400, which in turn is a portion of the physical frame 420. Since the present example pertains to CDMA radio transmission acording to the cdma2000 standard, the physical frame for transmission via the physical layer has a predetermined and fixed duration of 20 ms. If the available LTU blocks are not sufficient to fill the physical frame 420, another layer of repetition and zero-bits padding, as described above in connection with repetition and padding area 306, may be applied in repetition and padding area 408 to further improve error correction. The repetition rate of repeating LTU block 400 is identified by a 3-bit header L, where $L = \lfloor Physical\_frame\_length/LTU\_block\_length \rfloor - 1$ and $0 \leq L \leq 7$.

Those skilled in the art will recognize that a header may be used that is greater or less than three bits without departing from the scope of the invention.

Demultiplexing after reception will now be discussed. The RLP PDU recovery process at the receiving station may be performed in 2 stages: recovering the LTU block from the physical frame, and recovering the RLP block from the LTU block.

Referring to FIG. 4, LTU block 400 is recovered from the physical frame 420, which is 20 ms. in duration for the exemplary case. One approach for recovery includes performing bit-by-bit majority voting on each of the repetition blocks (including the original LTU block 400 and each of its replicates in repetition and padding area 408), which results in a single LTU block consisting of majority voted bits. However, this is only applicable when L is greater than 1, and recommended only when L is an even number. Another approach is to demultiplex the physical frame into multiple LTU blocks (i.e., L+1) for stage 2 processing.

Referring to FIG. 3 in conjunction with FIG. 4, the LTU block(s) (such as 400) is/are then separated into individual LTU's (such as 300) where the number and size of the LTU's are implied by the physical data rate and the repetition rate, L. Since there are (L+1) LTU blocks with the second approach, there are (L+1) repeated units of each LTU$_k$.

Referring now to FIG. 2 in conjunction with FIG. 3, one approach for recovering RLP blocks (such as 200) from each LTU (such as 300) includes performing bit-by-bit majority voting of the repetition blocks which results in a single RLP block consisting of majority voted bits. A CRC check is then performed on the resulting RLP block. Similar to the recovery of LTU blocks, this approach is only applicable when $R_k$ is greater than 1, and recommended only when it is an even number. A second approach is to perform a separate CRC check on each of the repeated RLP blocks until one passes the check. If the second approach is used in Stage 1, there will be (L+1) repeated units of each LTU$_k$. For each unit of LTU$_k$, either second stage approach can be performed to obtain the RLP block with the correct CRC check. RLP PDU's 100 etc. are then extracted from the resulting good RLP block (such as 200) using the multiplex unit header M (such as 212).

Multiple services, each with an associated transparent or non-transparent RLP instance, can share the same LTU or use different LTU's belonging to the same physical frame. The multiplexing scheme can change every frame time depending on the data rates and QoS requirements of each service.

It will thus be seen that the invention efficiently attains the objects set forth above, among those made apparent from the preceding description. In particular, the invention provides a system and method of multiplexing RLP PDU's from one or more RLP instances into LTU's to be sent to the physical layer and demultiplexing RLP PDU's from LTU's received from the physical layer. Those skilled in the art will appreciate that the configuration depicted in FIGS. 2, 3, and 4 provides improved error detection and/or correction by adding CRC to variable size link layer data blocks before performing repetition to achieve a fixed size LTU and includes repetition by mapping different numbers of LTU's to a fixed size physical layer frame.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of multiplexing link-layer protocol data units (PDU's) into physical-layer frames, comprising:
    aggregating at least one PDU into a multiplex unit;
    aggregating at least one of said multiplex units;
    adding to the aggregated multiplex units an error detection/correction code, for validating the aggregated multiplex unit and to form a block;
    aggregating said block and at least a copy of said block into a logical transmission unit; and,
    adding said logical transmission unit to a physical-layer frame.

2. The method according to claim 1 wherein said multiplex unit is of variable length.

3. The method according to claim 1 wherein the block is of variable length.

4. The method according to claim 1 wherein said logical transmission unit is of a predetermined length.

5. The method according to claim 4 wherein a space remaining in said logical transmission unit after aggregating a whole number of said blocks into said logical transmission unit is padded with a predetermined binary pattern.

6. The method according to claim 5 wherein said predetermined binary pattern consists of zeros.

7. The method according to claim 1 wherein said error detection/correction code is a cyclic redundancy check (CRC) code.

8. The method according to claim 1 wherein said multiplex unit includes header information descriptive of said PDU's aggregated into said multiplex unit.

9. The method according to claim 1 wherein said block includes header information specifying at least the number of multiplex units contained in said block.

10. The method according to claim 1 wherein said logical transmission unit contains header information specifying at least the number of blocks contained in said logical transmission unit.

11. A method of multiplexing link-layer protocol data units (PDU's) from at least one link-layer instance into physical-layer frames, comprising:
    aggregating at least one PDU from at least one of the link-layer instances into a multiplex unit;
    adding to the multiplex unit, information describing each PDU aggregated in the multiplex unit and its associated link-layer instance;
    aggregating at least one multiplex unit including the added information;
    adding to the aggregated multiplex units an error detection/correction code for validating the aggregated multiplex unit and for forming a block;
    aggregating at least said block and a copy of said block into a logical transmission unit; and,
    adding said logical transmission unit to a physical-layer frame.

12. The method according to claim 11 wherein said multiplex unit is of variable length.

13. The method according to claim 11 wherein the block is of variable length.

14. The method according to claim 11 wherein said logical transmission unit is of a predetermined length.

15. The method according to claim 14 wherein a space remaining in said logical transmission unit after aggregating a whole number of said blocks into said logical transmission unit is padded with a predetermined binary pattern.

16. The method according to claim 15 wherein said predetermined binary pattern consists of zeros.

17. The method according to claim 11 wherein said error detection/correction code is a cyclic redundancy check (CRC) code.

18. The method according to claim 11 wherein said multiplex unit includes header information descriptive of said PDU's aggregated into said multiplex unit.

19. The method according to claim 11 wherein said block includes header information specifying at least the number of said multiplex units contained in said block.

20. The method according to claim 11 wherein said logical transmission unit contains header information specifying at least the number of repetitions of said block contained in said logical transmission unit.

21. A method of multiplexing link-layer protocol data units (PDU's) into physical-layer frames, comprising:
    aggregating at least one PDU into a multiplex unit;
    aggregating at least one of said multiplex units;
    adding to the aggregated multiplex units an error detection/correction code, for validating the aggregated multiplex unit and to form a block;
    aggregating at least said block and a predetermined binary pattern into a logical transmission unit; and,
    adding said logical transmission unit to a physical-layer frame.

22. The method according to claim 21 wherein said aggregating at least one PDU into said multiplex unit includes aggregating a plurality of PDUs into said multiplex unit.

23. The method according to claim 21 further comprising aggregating at least one copy of said block into said physical-layer frame.

24. The method according to claim 21 further comprising aggregating a plurality of multiplex units prior to adding said error detection/correction code.

* * * * *